United States Patent [19]
Manfredi

[11] 3,989,101
[45] Nov. 2, 1976

[54] HEAT EXCHANGER

[76] Inventor: Frank A. Manfredi, 2026 W. 95th St., Cleveland, Ohio 44102

[22] Filed: Mar. 24, 1975

[21] Appl. No.: 561,035

Related U.S. Application Data

[63] Continuation-in-part of Ser. No. 481,489, June 21, 1974, which is a continuation of Ser. No. 281,542, Aug. 17, 1972, abandoned.

[52] U.S. Cl. ............................... 165/86; 165/121; 62/499
[51] Int. Cl.$^2$ .................... F28D 11/00; F28F 5/00
[58] Field of Search .................... 165/92, 110, 121; 62/499; 415/54, 211

[56] References Cited
UNITED STATES PATENTS

| | | | |
|---|---|---|---|
| 2,229,500 | 1/1941 | Goldsmith | 62/499 X |
| 3,139,736 | 7/1964 | Hanson | 62/499 |
| 3,260,306 | 7/1966 | Laing | 165/92 |
| 3,347,059 | 10/1967 | Laing | 62/499 |
| 3,370,736 | 2/1968 | Wingen | 62/499 |
| 3,866,668 | 2/1975 | Doerner | 165/92 |

*Primary Examiner*—Charles J. Myhre
*Assistant Examiner*—T. W. Streule
*Attorney, Agent, or Firm*—Woodling, Krost, Granger & Rust

[57] ABSTRACT

A heat exchanger is disclosed which is operated between a source and a sink comprising a frame journaling a rotor relative to the frame which rotor has a first and second rotor end. Heat transfer means which may include a fluid conducting conduit or an electrical heating path forms a conduction path between the first and second rotor ends. The conduction path extends back and forth between a region proximate a first rotor end and a region proximate a second rotor end a plurality of times. The conduction path is connected to either the source or the sink to provide energy transfer therebetween. Means are provided for rotating the rotor for transferring heat between the conduction path and the other of the source and the sink. The foregoing abstract is merely a resume of one general application, is not a complete discussion of all principles of operation or applications, and is not to be construed as a limitation on the scope of the claimed subject matter.

16 Claims, 15 Drawing Figures

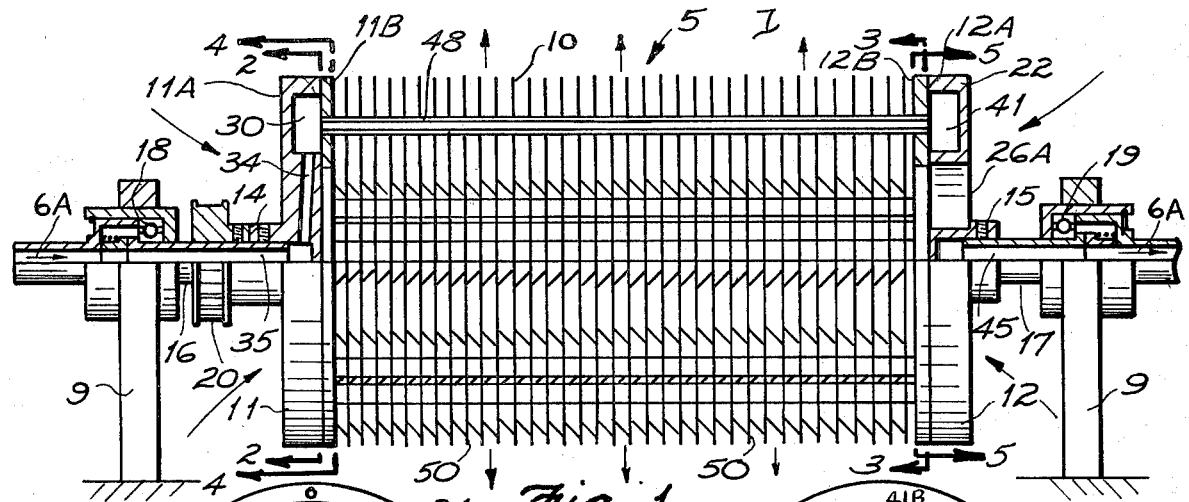

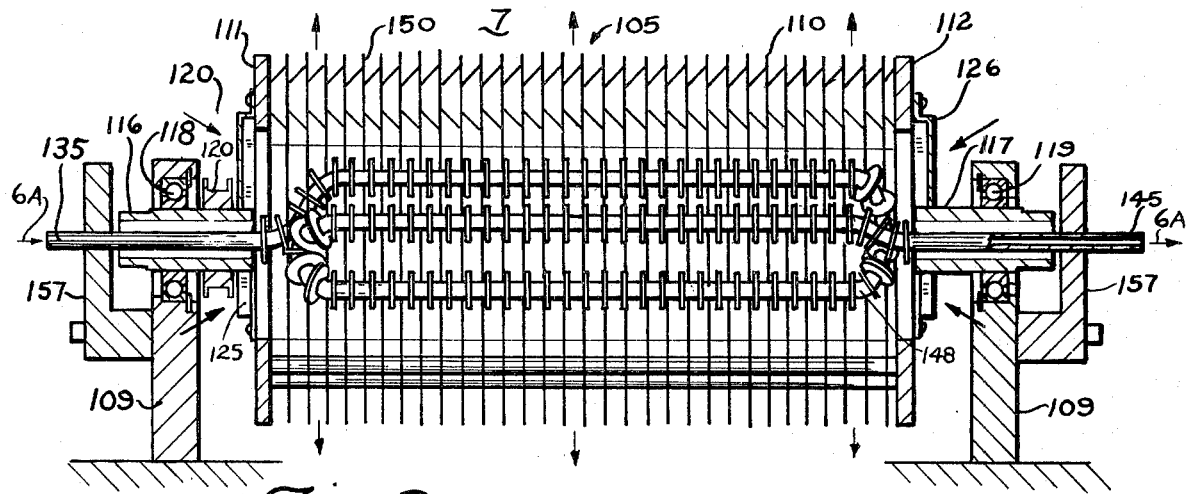
Fig. 9
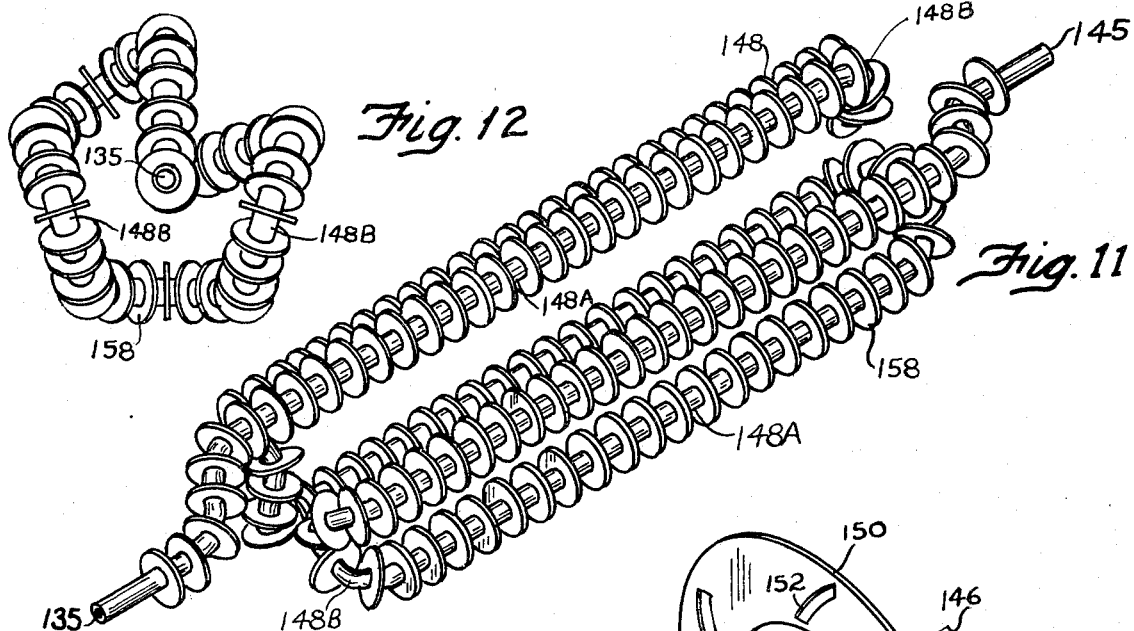
Fig. 12
Fig. 11
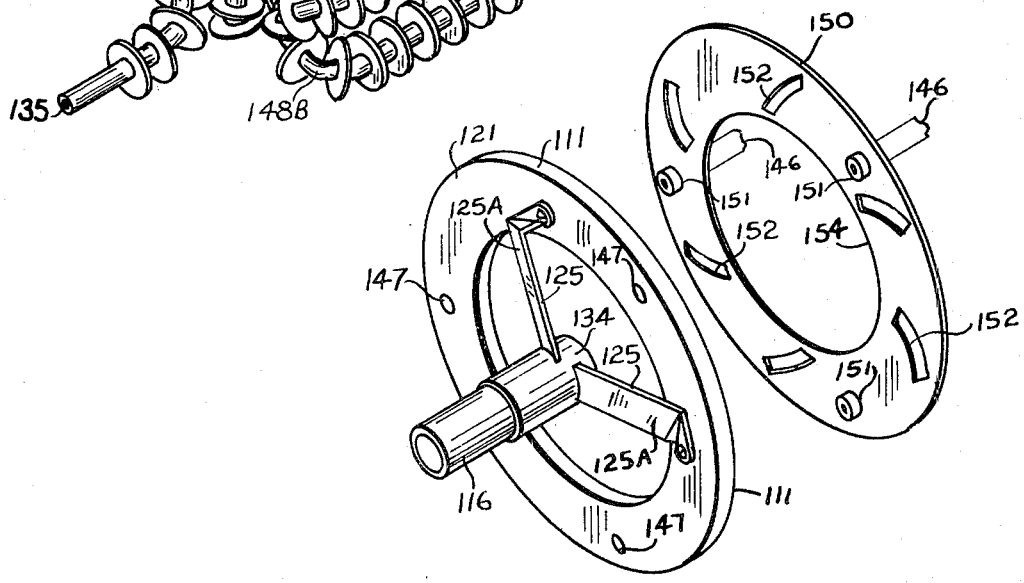
Fig. 10

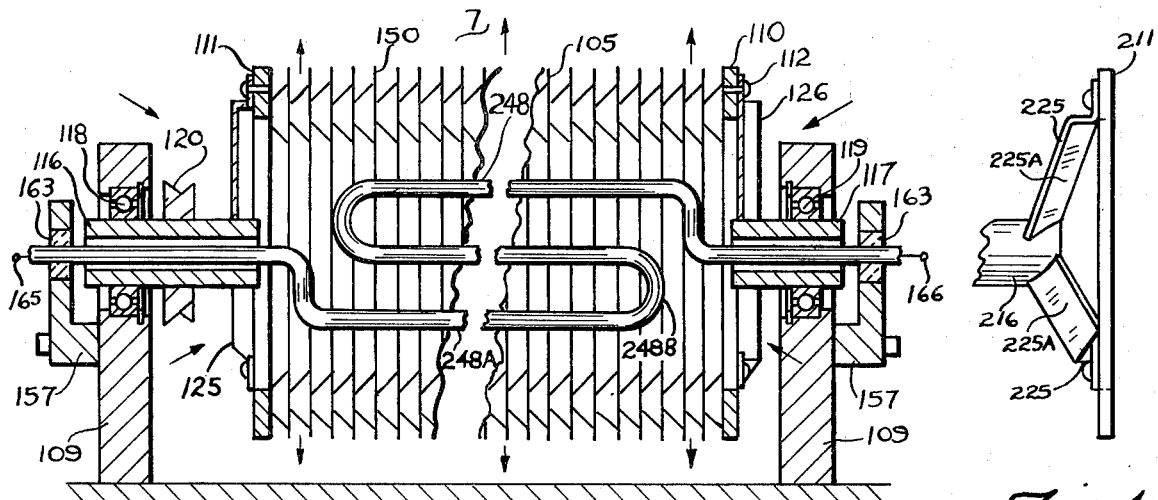
Fig. 13
Fig. 14
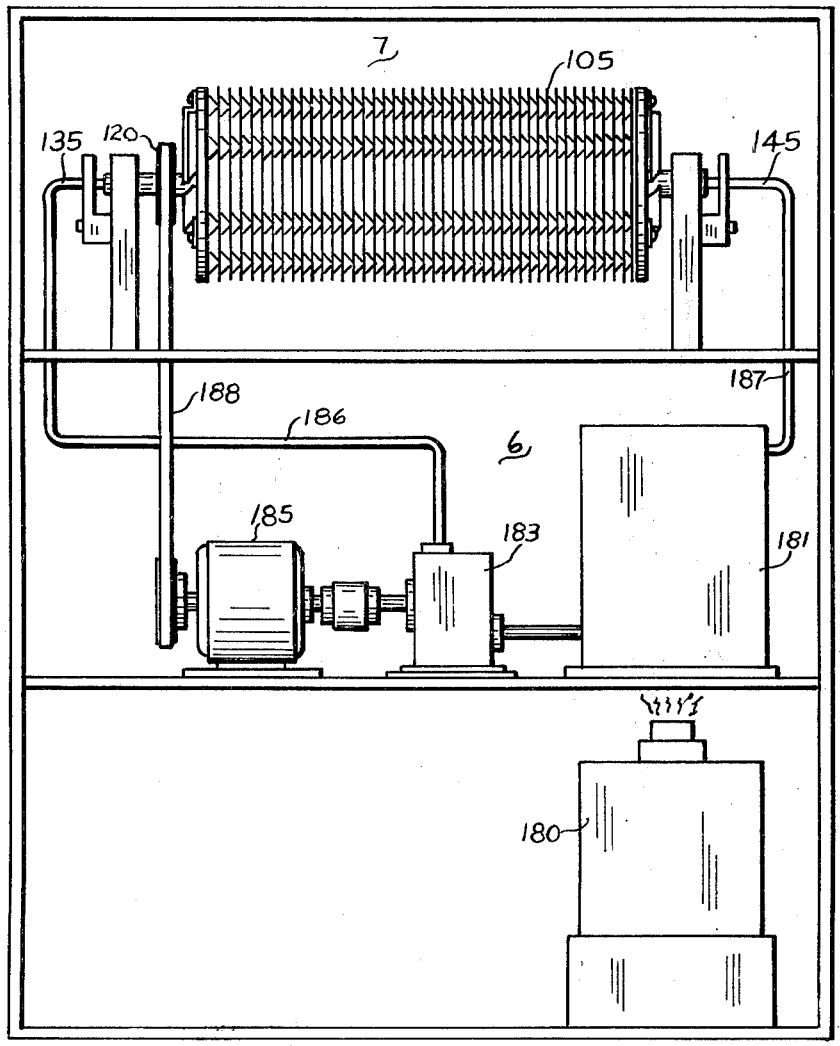
Fig. 15

HEAT EXCHANGER

CROSS-REFERENCE TO RELATED APPLICATIONS

This is a continuation-in-part of my pending application, Ser. No. 481,489, filed June 21, 1974 which was a continuation of my prior application Ser. No. 281,542, filed Aug. 17, 1972, now abandoned, which claims priority from my Italian application Ser. No. 32916 A/71, filed Dec. 24, 1971, and my Italian application Ser. No. 20889 A/72, filed Feb. 22, 1972.

BACKGROUND OF THE INVENTION

1. Field of the Invention:

The invention relates to heat exchange and more particularly to heat exchange including a rotary movable element.

2. Description of the prior art:

Various types of heat exchange devices have been available to the prior art. One class of heat exchange devices included devices having a cylindrically shaped rotor which was rotated in an ambient fluid relative to a frame. Fluid conducting conduits connected to a heat source were mounted to the rotor. Heated fluid from the heat source would pass through the rotor and return to the heat source. Upon rotation of the rotation of the rotor the fluid moved through the conduit and exchanged heat with the ambient fluid as the conduit rotated through the ambient fluid. These rotary heat exchange devices never obtained a wide acceptance since the efficiency of these heat exchangers was lower than the conventional non-rotating heat exchangers. With the entire world facing an energy shortage, the art requires a heat exchanger of higher efficiency so that the world may use the existing energy supply more efficiently. Therefore an object of this invention is to provide a heat exchanger which overcomes the aforementioned disadvantages of the prior art and provides a heat exchanger which is highly efficient to enable the world to make better use of the limited resources of energy.

Another object of this invention is to provide a heat exchanger wherein a single heat conduction paths extends a plurality of times between a first and a second end of the rotor enabling a more efficient transfer of heat between the conduction path and an ambient fluid.

Another object of this invention is to provide a heat exchanger having a first fan member for forcing ambient fluid through apertures in the rotor ends to direct the ambient fluid in proximity to the conduction path of the heat exchanger.

Another object of this invention is to provide a heat exchanger having a plurality of annular fins having components thereon for forcing ambient fluid past the conduction path of the heat exchanger to enable the transfer of heat between the conduction path and the ambient fluid.

Another object of this invention is to provide a highly efficient heat exchanger which can be mass produced to meet the needs of the energy shortage.

Another object of this invention is to provide a heat exchanger which may be operated from a fluid source or an electrical source.

Another object of this invention is to provide a heat exchanger which is reliable and inexpensive to manufacture.

SUMMARY OF THE INVENTION

The invention may be incorporated into a heat exchanger operable between a source and a sink, comprising in combination: a frame, a rotor having a first and a second rotor end, heat transfer means forming a conduction path between said first and second rotor ends which extends from a region proximate said first rotor end to a region proximate said second rotor end a plurality of times, means connecting said conduction path to one of the source and the sink to provide energy transfer between said conduction path and said one of the source and the sink, means for journaling said rotor relative to said frame, and means for rotating said rotor to transfer heat between said conduction path and the other of the source and the sink.

Other objects and a fuller understanding of this invention may be had my referring to the following description and claims, taken in conjunction with the accompanying drawings: in which:

BRIEF DESCRIPTION OF THE DRAWINGS

FIG. 1 is a side view partially in section of a heat exchanger incorporating the invention;

FIG. 2 is a sectional view along lines 2—2 of the heat exchanger shown in FIG. 1;

FIG. 3 is a sectional view along lines 3—3 of the heat exchanger shown in FIG. 1;

FIG. 4 is a sectional view along lines 4—4 of the heat exchanger shown in FIG. 1 illustrating the fluid flow;

FIG. 5 is a sectional view along lines 5—5 of FIG. 1 showing the fluid flow;

FIG. 6 is a side view of one of a plurality of annular fins shown in FIG. 1;

FIG. 7 is a sectional view of a portion of the annular fin shown in FIG. 6;

FIG. 8 is a side sectional view of a venturi operable with the invention shown in FIG. 1;

FIG. 9 is a side sectional view of a heat exchanger which is a variation of the heat exchanger shown in FIG. 1;

FIG. 10 is a partial exploded view of the heat exchanger shown in FIG. 9;

FIG. 11 is an isometric view of the heat conduction conduit utilized in the heat exchanger shown in FIG. 9;

FIG. 12 is an end view of the conduit shown in FIG. 11;

FIG. 13 is a side view showing a variation of the heat exchangers shown in FIGS. 1 and 9 incorporating an electrical heating element;

FIG. 14 is a side view of a rotor end which is compatible for use with the heat exchangers shown in FIGS. 1, 9 and 13; and FIG. 15 is a complete heating system incorporating the invention.

DESCRIPTION OF THE PREFERRED EMBODIMENT

FIG. 1 illustrates a heat exchanger 5 for transferring heat between a fluid source symbolized by arrows 6A and shown as source 6 in FIG. 15 and a fluid sink 7 shown as an ambient fluid such as ambient air. A rotor 10 has a first and a second rotor end 11 and 12 including central hubs 14 and 15 attached to shafts 16 and 17 for journaling with bearings 18 and 19, respectively, suspended from a frame 9. A pulley 20 is mounted to central hub 14 of the first rotor end 11 for rotating the rotor 10 relative to the frame 9. Each of the rotor ends 11 and 12 includes a housing 11A and 12A and a cover plate 11B and 12B. The housing 11A of the first rotor end 11 is shown in FIG. 2 whereas the cover plate 12B of the second rotor end 12 is shown in FIG. 3. The housings 11A and 12A are secured to the cover plates 11B and 12B by conventional means such as screws (not shown) to form the first rotor end 11 shown in FIG. 4 and the second rotor end 12 shown in FIG. 5. Each of the rotor ends 11 and 12 has an annular portion 21 and 22 connected by a plurality of spokes 25 and 26 to the central hubs 14 and 15, respectively, forming apertures through the rotor ends 11 and 12 adjacent the spokes 25 and 26. The first rotor end 11 includes a connection channel 30 and a first and a second transfer channel 31 and 32 located about the rotor end 11 in the annular portion 21. The second rotor end 12 includes a connection channel 40 and a first and a second transfer channel 41 and 42 located about the rotor end 12 in the annular portion 22. The first rotor end 11 has a plurality of orifices located in the cover plate 11B including first orifices 31A adjacent the connection channel 30, second and third orifices 32A and 33A adjacent the first transfer channel 31, and fourth and fifth orifices 34A and 35 A adjacent the second transfer channel 32. The second rotor end 12 has a plurality of orifices located in the cover plate 12B including first and second orifices 41A and 42A adjacent the first transfer channel 41, third and fourth orifices 43A and 44A adjacent the second transfer channel 42, and fifth orifices 45A adjacent the connection channel 40. The orifices 31A-35A and 41A-45A have been shown as pairs of orifices but it is understood that a single orifice can be incorporated into the invention. A duct 34 through one of the spokes 25 in the first rotor end 11 interconnects the connection channel 30 with a hub duct 35 whereas a duct 44 through one of the spokes 26 in the second rotor end 12 interconnects the connection channel 40 to a hub duct 45. Each of the spokes 25 of the first rotor end 11 includes a fan surface 25A which complements by opposite pitch a fan surface 26A on each of the spokes 26 of the second rotor end 12.

The first and second rotor ends 11 and 12 are interconnected by a plurality of conduits one shown as 48 which extend through the orifices 31A—35A and 41A—45A of the cover plates 11B and 12B into counter-sinks 41B—45B shown in FIG. 3. Consequently, the conduits may be secured to the rotor ends 11 and 12 by flaring the conduits rather than welding or the like. The conduits 48 connect orifices 31A–35A to orifices 41A–45A, respectively, providing a single series conduct path having an input at hub duct 35 and an output at hub duct 45. The conduction path extends through the duct 34 to connection channel 30 and sequentially through orifices and channels 31A, 41A, 41, 42A, 32A, 31, 33A, 43A, 42, 44A, 34A, 32, 34A, 45A to connection channel 40 as indicated by the arrows. The connection channel 40 is connected to duct 45 through the duct 44 to return the fluid to the source 6 as indicated by the arrow 6A. Accordingly, the fluid from the source 6 enters the hub duct 35 and travels a plurality of times from the first rotor end 11 to the second rotor end 12 and travels a plurality of times from the second rotor end 12 to the first rotor end 11 to exit from hub duct 45.

FIG. 6 is a side view of one of a plurality of annular fins 50 having a central aperture 54 and orifices 51 for accommodating the conduits 48 connecting the orifices 31A–35A to the orifices 41A–45A. The annular fins 50 include a plurality of elements 52 having a component thereof being substantially perpendicular to the plane of the fin 50 as shown in FIG. 7. The elements 52 may be punched from the fin 50 on three sides and then turned outwardly from the plane of the fin 50. Each of the orifices 51 may be formed by a punching process causing a lip 51A about each of the orifices 51. The rotor 10 is fabricated with a plurality of the fin 50 established parallel to and interposed between the first and second rotor end 11 and 12 with the conduits 48 extending through the orifices 51 of the annular fins 50. The lip 51A about each of the orifices 51 thermally contact the conduits 48 with the elements 52 spacing adjacent fins 50 from one another. The rotor ends 11 and 12 produce abutment between the elements 52 and the next adjacent fin 50.

As the rotor 10 is rotated relative to the frame 9, a first fan including the surfaces 25A and 26A of the first and second rotor ends 11 and 12 force ambient fluid 7 through the apertures in the rotor ends 11 and 12 adjacent the spokes 25 and 26 and through the central apertures 54 of the fins 50 to bring the ambient fluid 7 into the interior of the rotor 10 as shown by the arrows. A second fan including the elements 52 of the plural fins 50 force the ambient fluid 7 from the interior of the rotor 10 between the plural fins 50 to transfer heat between the conduction path comprising conduits 48 and the ambient fluid 7. The second fan also expells the ambient fluid 7 outwardly as shown by the arrows in a manner similar to what is commonly called a squirrel cage fan. Accordingly, the flow of source fluid back and forth between the first and second rotor ends 11 and 12 in conjunction with the lips 51A results in a superior thermal transfer between the source 6 and the plural fins 50. In addition, the forced flow of ambient fluid 7 through the first and second rotor ends 11 and 12 and between the rotor fins 50 results in an increased thermal transfer between the plural fins and the ambient fluid 7.

FIG. 8 is a magnified view of a venturi 59 which may interposed within the conduit 48 for reducing the flow rate of the source fluid through the conduction path shown in FIGS. 1-5. The venturi 59 includes a first venturi cone 61 and a second venturi cone 62 each being mounted to the inner surface of the conduit 48. The venturi 59 in FIG. 8 is optional and may or may not be needed depending on the fluid source and the heat exchange application. In addition, the venturi 59 may be located in another location in the conduction path including the channels or ducts.

It will be appreciated that the heat exchanger 5 shown in FIG. 1 may be used with either a heating or a cooling source 6, or may be used with the ambient fluid 7 being the source. In addition, the conduction path may be an electrical conduction path wherein each of the conduits 48 are electrical heating elements interconnected by electrical connectors rather than fluid transfer channels.

FIG. 9 is a side view with the rotor and frame in section and the conduction path in full of a variation of the invention shown in FIG. 1. The heat exchanger 105 includes a rotor 110 having a first and a second rotor end 111 and 112 with each rotor end having a central hub or shaft 116 and 117 for journaling with bearings 118 and 119 suspended from a frame 109. A pulley 120 is mounted to the first rotor end 111 by conventional means such as a screw (not shown).

FIG. 10 is an isometric exploded and magnified view of a portion of the invention shown in FIG. 9 illustrating the first rotor end 111 and one of a plurality of annular fins 150. The first rotor end 111 varies from the first rotor end 11 shown in FIG. 1 in that the annular portion 121 is a solid member without channels. The annular portion 121 is connected to the central hub or shaft 116 by a plurality of spokes 125. Each of the spokes 125 has a surface 125A which forms an angle relative to the rotor end 111 to provide a fan force through the apertures adjacent the spoke members 125 when the rotor 110 is rotated. The pitch of spokes 125 of the first rotor end 111 is opposite to the pitch of spokes 126 of the second rotor end 112 in a manner similar to FIGS. 4 and 5. The annular fin 150 is substantially identical to the annular fin 50 shown in FIG. 6. except that only three orifices 151 are required to mechanically fasten the plural annular fins 150 to the rotor 110. Each annular fin 150 includes a central aperture 154 and a plurality of elements 152 similar to elements 52 having a component thereof being substantially perpendicular to the body of the annular fin 150. The rotor 110 is fabricated by extending three support members or rods 146 through the orifices 151 of the plural annular fins 150 and through orifices 147 in the first rotor end 111 and similar apertures located in the second rotor end 112. The rods 146 are securely fastened to the first and second rotor ends 111 and 112 with the plural annular fins 150 interposed therebetween and spaced by the elements 152.

The frame 109 includes mounting brackets 157 for mounting input and output ducts 135 and 145 of a conduit conduction path 148. The rotor shafts 116 and 117 are hollow allowing the single conduit 148 to extend through the central portion of the shafts 116 and 117 to be rigidly mounted to the frame 109. This eliminates the need for rotatable fluid couplings as required in FIG. 1. The ducts 135 and 145 may be thermally insulated (not shown) from the mounting brackets 157 if the application so requires.

FIGS. 11 and 12 are an isometric view and an end view of the heat conduction path 148 shown in FIG. 9. The input duct 135 and the output duct 145 are on the ends of a single conduit path for extending from a region proximate the first rotor end 111 to a region proximate the second rotor end 112 a plurality of times and for extending from a region proximate the second rotor end 112 to a region proximate the first rotor end 111 a plurality of times. The conduction path 148 includes fin means 158 which are shown as individual fins but may be a helix or the like. The conduction path 148 includes a plurality of substantially straight portions 148A interconnected by a plurality of corner portions 148B to provide the back and forth fluid flow as previously described. The substantially straight portions 148A are spaced from the center input duct 135 and from the axis of rotation of the rotor 110 with the corner portions 148B interconnecting the substantially straight portions.

The invention in FIG. 9 operates in a manner similar to the invention shown in FIG. 1. When the rotor 110 is rotated about frame 109, a first fan including the spokes 125 and 126 of the first and second rotor ends 111 and 112 force ambient fluid 7 through the apertures adjacent the spokes 125 and 126 of the first and second rotor ends 111 and 112 through the apertures 154 of the annular fins 150 to bring the ambient fluid 7 between the straight portions 148A of the conduction path 148 and along the axis of rotation of the rotor 110. The elements 152 on the plural annular fins 150 draw the ambient fluid 7 from the interior of the rotor 110 across the conduction path 148 and fin means 158. The ambient fluid 7 exchanges heat with the conduction path 148 and is expelled as shown by the arrows in a manner similar to that described in FIG. 1. Whereas, the invention in FIG. 1 requires the conduction path to be mounted to and rotated with the rotor 50, the invention in FIG. 9 requires the conduction path to be mounted to the frame 109 while the rotor 110 rotates thereabout.

FIG. 13 is a modification of the invention shown in FIG. 9 incorporating an electrical heating path 248. The frame 109 and rotor 110 is substantially identical to the frame and rotor 110 shown in FIG. 9 so the same numbers have been used to identify the similar parts between FIGS. 9 and 13. The electrical heating path 248 may be in the form of a resistance heater or an infrared heater or similar devices and is shaped similarly to the fluid heating path in FIG. 9 having a plurality of substantially straight portions 248A interconnected by corner portions 248B. The straight portions 248A are displaced from the axis of rotation of the rotor 110 as shown in FIG. 9 so that the incoming ambient fluid 7 can flow along the rotor axis and thereby traverse the plural straight portions 248A of the electrical heating path 248. Thermal insulation 163 is provided between the electrical heating path 248 and the frame bracket 157 as previously described as being optional in FIG. 9.

The apparatus in FIG. 13 operates substantially identically to FIG. 9 except electrical power is applied between terminals 165 and 166 to provide energy transfer between the electrical source (not shown) and the ambient fluid 7.

FIG. 14 is a side view of a variation of the rotor ends shown in FIGS. 2, 4, 9 and 10. The rotor end 211 has annular portion 221 which is connected to a central hub or shaft to 216 by a plurality of spokes 225. The plural spokes 225 form an angle with the plane of the annular portion 221 of approximately 30 degrees thus extending hub or shaft 216 out of the plane of the annular portion 221. The spokes 225 include fan surfaces 225A for drawing ambient fluid 7 into the interior of the rotor. The inventor has discovered that greater air flow is produced under some application by the spokes being established at an angle as shown in FIG. 14 since the fan surfaces 225A draw the ambient fluid 7 in a direction more accurately along the arrows shown in FIGS. 1, 9, and 13. The inventor has also determined that the rotor end shown in FIGS. 1, 9 and 13 is more desirable for heating whereas the rotor ends shown in FIG. 14 is more desirable for cooling. The angle rotor spokes of FIG. 14 may be used in either FIGS. 1, 9 and 13. An auxiliary fan (not shown) may be located on the rotor shafts beyond the frame or for example, between the frame 109 and the bracket 157. This auxiliary fan would add the ambient fluid flow into the interior of the rotor.

FIG. 15 is a heating system incorporating the heat exchanger 105 shown in FIG. 9. The heat source 6 includes a heater 180 which is thermally coupled to a reservoir 181 containing the source fluid (not shown) for circulation in the heat exchanger system. A pump 183 operable from a motor 185 pumps the heated source fluid through conduit 186 to the input duct 135 to circulate through the heat exchanger 105. The cool source fluid returns from the output duct 145 through conduit 187 to the reservoir 181. A V-belt 188 interconnects the motor 185 with the pulley 120 for rotating the heat exchanger 105 as previously described for exchanging heat with the ambient fluid 7. Either the heat exchanger shown in FIG. 1 or FIG. 9 can be used with the heating system shown in FIG. 15.

The invention has been described using FIG. 1 for example as a heat exchanger operable between a source 6 and a sink 7 comprising in combination a frame 9, and a rotor 10 having a first and a second rotor end 11 and 12. Heat transfer means shown as conduits 48 form a conduction path between the first and second rotor ends 11 and 12 which extends from a region proximate the first rotor end 11 to a region proximate the second rotor end 12 a plurality of times. The conduction path 48 is connected to one of the source and the sink to provide energy transfer between the conduction path 48 and said one of the source and the sink. The rotor is journaled relative to the frame 9 for rotating the rotor 10 to transfer heat between the conduction path 48 and the other of the source and the sink.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A heat exchanger operable between a fluid source and a fluid sink, comprising in combination:
    a frame;
    a rotor having a first and a second rotor end with aperture means therein;
    said rotor including a plurality of fins having central aperture means with said plurality of fins being established parallel to and interposed between said first and second rotor ends;
    heat transfer means forming a conduction path between said first and second rotor ends with extends from a region proximate said first rotor end to a region proximate saiid second rotor end a plurality of time and extends from a region proximate said second rotor end to a region proximate said first rotor end a plurality of times;
    said heat transfer means having an input proximate one of said rotor ends and an output proximate the other of said rotor ends;
    means for connecting said conduction path to one of the fluid source and the fluid sink and for immersing said rotor in the other of the fluid source and the fluid sink to provide energy transfer between said conduction path and the other of the fluid source and the fluid sink;
    means for journaling said rotor relative to said frame;
    and fan means mounted for movement with said rotor for producing a flow of the other of the fluid source and the fluid sink through said apertures in said first and second rotor ends and between ssaid plurality of fins upon rotation of said rotor to transfer heat between said conduction path and the other of the fluid source and the fluid sink.

2. A heat exchanger as set forth in claim 1, wherein said and fan means including each of said fins having a component thereof extending in a direction parallel to the axis of rotation of said rotor.

3. A heat exchanger as set forth in claim 2, wherein said fan means includes a fan member proximate each of said aperture means of said rotor ends for producing flow of the fluid through said aperture means of said rotor ends.

4. A heat exchanger as set forth in claim 1, wherein said conduction path has a plurality of substantially straight portions sequentially interconnected by a plurality communicating apertures within said rotor ends.

5. A heat exchanger as set forth in claim 4, wherein said substantially straight portions of said conduction path are uniformly spaced about the axis of rotation of said rotor.

6. A heat exchanger as set forth in claim 1, including means for mounting said heat transfer means to said rotor.

7. A heat exchanger as set forth in claim 1, including means for statically mounting said heat transfer means to said frame.

8. A heat exchanger as set forth in claim 1, including venturi means in said conduction path.

9. A heat exchanger as set forth in claim 1, wherein said means for rotating said rotor means includes a pulley mounted to one of said first and second rotor ends.

10. A heat exchanger as set forth in claim 1, wherein each of said rotor ends includes a central hub and an annular portion interconnected by a plurality of spokes;
    and said fan means includes a first fan member comprising said spokes having a fan surface.

11. A heat exchanger as set forth in claim 10, wherein said fan surface of said first rotor end complements said fan surface of said second rotor end resulting in each of said fan surfaces drawing said fluid into said rotor upon rotation of said rotor in a first direction.

12. A heat exchanger as set forth in claim 11, wherein said fan means includes a plurality of
    second fan members including each of said fins having a component thereof extending in a direction parallel to the axis of rotation of said rotor for complementing said first fan member by expelling said fluid from the rotor upon rotation thereof in said first direction.

13. A heat exchanger as set forth in claim 1, wherein said conduction path includes an electrical heating path.

14. A heat exchanger for transferring heat between a fluid source and a fluid sink, comprising in combination;
    a frame;
    a rotor having a first and a second rotor end;
    each of said rotor ends having a central hub and an annular portion interconnected by a plurality of spokes and including a connection channel and a first and a second transfer channel located in said annular portion about said rotor end with aperture means through said rotor ends adjacent said channels;
    said first rotor end having a first orifice adjacent said connection channel and a second and a third orifice adjacent said first transfer channel and a fourth and a fifth orifice adjacent said second transfer channel;

said second rotor end having a first and a second orifice adjacent said first transfer channel and with a third and a fourth orifice adjacent said second transfer channel and a fifth orifice adjacent said connection channel;

a plurality of conduits connecting said first through fifth orifices of said first rotor end to said first through fifth orifices of said second rotor end providing a conduction path having an input through said connection channel at one of said rotor ends and an output through said connection channel at the other of said rotor ends and extending from said first rotor end to said second rotor end a plurality of times and extending from said second rotor end to said first rotor end a plurality of times;

a plurality of fins each being thermally coupled to said plurality of conduits and each having a central fin aperture means;

means for journaling said rotor relative to said frame;

means connecting said input and output of said conduction path to one of the fluids to provide thermal conduction between said connection path and said one of the fluids;

means for rotating said rotor relative to said frame;

a first fan including each of said spokes having a fan surface for forcing the other of the fluids through said aperture means of said rotor ends and said fin apertures to be in proximity to said plurality of fins upon rotation of said rotor;

and a second fan including an element extending from each of said plurality of fins for forcing said other of the fluids between said plurality of fins upon rotation of said rotor for transferring heat between said conduction path and said other of the fluids.

15. A heat exchanger for transferring heat between a fluid source and a fluid sink, comprising in combination;

a frame;

a rotor having a first and a second rotor end;

each of said rotor ends having a central hub and an annular portion interconnected by a plurality of spokes with aperture means through said rotor ends;

a plurality of annular fins each having central aperture means and established parallel to and interposed between said first and second rotor ends;

means for journaling said rotor relative to said frame;

a conduit mounted relative to said frame with said conduit extending through said central hub of said rotor and said aperture means of said annular fins;

said conduit having a plurality of substantially straight portions sequentially interconnected by a plurality of corner portions forming a conduction path having an input adjacent one of said rotor ends and an output adjacent the other of said rotor ends with said rotor ends with said conduction path extending from a region proximate said first rotor end to a region proximate said second rotor end a plurality of times and extending from said region proximate said second rotor end to said region proximate said first rotor end a plurality of times;

said substantially straight portions of said conduit being uniformly spaced about the axis of rotation of said rotor;

fin means thermally coupled to said conduit;

means connecting said input and said output of said conduit to one of the fluids to provide thermal conduction between said conduction path and said one of the fluids;

means for rotating said rotor relative to said conduit;

a first fan including each of said spokes having a fan surface for forcing the other of the fluids through said aperture means of said rotor ends and said annular fins to be in proximity to said fin means upon rotation of said rotor;

and a second fan including an element extending from each of said annular fins for forcing said other of the fluids between said fin means upon rotation of said rotor for transferring heat between said conduction path and said other of the fluids.

16. A heat exchanger for transferring heat between an electrical source and an ambient fluid, comprising in combination:

a frame;

a rotor having a first and a second rotor end;

each of said rotor ends having aperture means therethrough;

a plurality of annular fins each having a central aperture means and established between said first and second rotor ends;

electrical heating means forming a heating path between said first and second rotor ends with extends from a region proximate said first rotor end to a region proximate said second rotor end a plurality of times;

means connecting said electrical heating means to the electrical source to provide energy transfer from the electrical source to said electrical heating means;

means for journaling said rotor relative to said frame;

means for rotating said rotor relative to said frame;

a first fan including a fan surface adjacent said aperture means of said rotor for forcing the ambient fluid through said aperture means of said rotor ends and said annular fins upon rotation of said rotor to be in proximity to said heating path;

and a second fan including an element extending from each of said annular fins for forcing the ambient fluid passed said heating path for transferring heat between said heating path and the ambient fluid.

* * * * *